United States Patent Office 2,817,665
Patented Dec. 24, 1957

2,817,665

FLUORESCENT DITRIAZOLE COMPOUNDS

Reinhard Zweidler, Basel, and Ernst Keller, Binningen, Switzerland, assignors to J. R. Geigy A.-G., Basel, Switzerland No Drawing. Application March 17, 1955
Serial No. 495,041

Claims priority, application Switzerland March 19, 1954

6 Claims. (Cl. 260—308)

The present invention concerns fluorescent stilbyl ditriazole compounds which are distinguished by a greenish-blue fluorescence light, slight self-colour and good affinity to cellulose fibres. They are therefore, suitable for the optical brightening of these materials in daylight as even a very slight content optically compensates the yellowish appearance. The invention also concerns processes for the production of the new ditriazole compounds, their use for the brightening of more or less white carriers in daylight and the attainment of brightened material with the aid of these agents.

It has been found that valuable stilbyl ditriazole compounds are obtained if an equivalent of a diazotised 4-aminostilbene-2-sulphonic acid and of any aromatic diazo compound are coupled separately in any order desired with an m-diaminobenzene compound which can be coupled twice, and the o-aminoazo dyestuffs obtained are oxidised by known methods in steps, intermittently or simultaneously to form the corresponding 1.2.3-triazole compounds.

The 4-aminostilbene-2-sulphonic acids as well as the desired aromatic diazo components used can contain the simple substituents usual in azo dyestuffs, e. g. halogen, alkyl, alkoxy, carboxyl, sulphonic acid groups. They should not, however, contain any colour carrying groups such as nitro or arylazo groups.

The 4-aminostilbene-2-sulphonic acids used according to this invention can be obtained for example according to the process of U. S. patent specification No. 2,657,228 by condensing 4-nitrotoluene-2-sulphonic acid arylesters with aromatic aldehydes in the presence of strong organic nitrogen bases such as piperidine, in the warm, saponifying the arylester group to form the free sulphonic acid or the salts thereof and reducing the nitro group to the amino group.

Further diazo components are amino compounds of the benzene and naphthalene series, e. g. aminobenzene sulphonic acids or carboxylic acids, in particular however, aminonaphthalene sulphonic acids or a 4-aminostilbene-2-sulphonic acid which can be identical to or different from the former.

Examples of m-diaminobenzene compounds which can be twice coupled are 1.3-diaminobenzene, 2.4-diamino-1-methylbenzene, 2.4-diamino-1-methoxy- or -ethoxybenzene, 2.4-diamino-1-chlorobenzene, 2.4-diaminobenzene-1-carboxylic acid, 2.4-diaminobenzene-1-sulphonic acid as well as derivatives thereof such as 2.4-diaminobenzene-1-methyl- or -ethyl sulphone.

It is advantageous to perform the coupling in steps. The one diazo compound is coupled with the m-diaminobenzene compound which can be coupled twice, the components being so chosen that a water soluble o-aminoazo dyestuff is obtained. This is oxidised in aqueous solution, e. g. with the aid of ammoniacal copper sulphate, by boiling, advantageously under the introduction of air, to form the corresponding 2-aryl-5-amino-1.2.3-benztriazole compound. This compound is coupled in the 4-position with the second diazo compound, the coupling being done in neutral to weakly acid solution, and the o-aminoazo dyestuff so obtained is again oxidised to form the triazole compound. However, the two diazo compounds can also be coupled with the 1.3-diaminobenzene compound to form the disazo dyestuff and this can be oxidised direct to form the ditriazole compound; but although the process in steps is more laborious it is more advantageous.

The new stilbyl ditriazole compounds correspond to the general Formula I

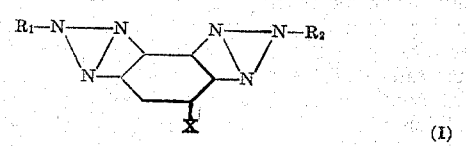

(I)

In this formula $R_1$ and $R_2$ represent aromatic radicals and at least one of them represents a 4-stilbyl radical sulphonated in the 2-position, X represents hydrogen or a substituent, e. g. halogen, a methyl, alkoxy, carboxyl, sulphonic acid or modified sulphonyl group, and which compounds are free from groups imparting dyestuff characteristics, i. e. chromophores such as nitro, azo and azoxy groups and aromatically bound hydroxy and amino groups.

In the form of their water soluble alkali salts, the new ditriazole compounds are more or less deep yellow coloured powders, depending on the composition. The diluted aqueous solutions thereof are colourless to very slightly yellow coloured and they fluoresce strong greenblue in ultra-violet light. They draw onto cellulose fibres from aqueous solutions which contain soap or synthetic washing agents as well as salts, such as sodium carbonate, Glauber's salt or alkali polyphosphates and bring about the brightening thereof in daylight, even in very small amounts, by optical compensation of the yellowish appearance. They can also be used for the brightening of other more or less white substrata, for example of starches, soaps and synthetic washing agents. They are stable in textile washing and rinsing liquors which contain the usual amounts of oxid bleaching agents, such as for example, per salt, hydrogen peroxide or alkali hypochlorites. Because of their green-blue fluorescence light, they can also be used with other optical brightening agents which have a rather reddish-blue fluorescence, in order to attain a beautiful white shading.

The following examples illustrate the invention without limiting it in any way. The parts are given as parts by weight and the temperatures are in degree centigrade. The relationship of parts by weight to parts by volume is as that or kilogrammes to litres.

parts of water and 120 parts of 25% ammonia is added and the whole is kept at a temperature of 95–97° until the oxidation of the dyestuff is complete. The raw ditriazole compound is then salted out by the addition of sodium chloride, filtered off and washed. The ditriazole compound is purified by dissolving in hot water, copper is removed with sodium sulphide as copper sulphide, reducable oxidation products are decomposed with sodium hydrosulphite, the ditriazole compound is salted out and dried in the vacuum. The purified ditriazole compound is a yellowish powder which dissolves in water with a weak pale yellowish colour. It is a valuable brightening agent for cellulose fibres, linear polyamide fibres as well as for soaps and synthetic washing agents. It lends to these more or less white substrata a more white appearance in daylight. It is very fast to light and chlorine and can be used in textile treatment liquors which contain active chlorine without any loss of optical effect. Also after treatment of textile fibres brightened therewith in the usual bleaching baths containing active chlorine does not adversely affect the white shading.

The same compound is obtained if 13.7 parts of m-aminobenzoic acid are indirectly diazotised, the diazo compound is coupled at a temperature of 10–12° with a solution of 39.2 parts of 5-amino - 2 - (stilbyl-4')-1.2.3-benztriazole-2'-sulphonic acid in 200 parts of dimethyl formamide, the mineral acid is buffered with 25 parts of crystallised sodium acetate, the o-aminoazo dyestuff obtained is dissolved in pyridine at 90–95° and oxidised until the dyestuff has completely disappeared at a temperature of 90–95° with a mixture of 60 parts of crystallised

EXAMPLE 1

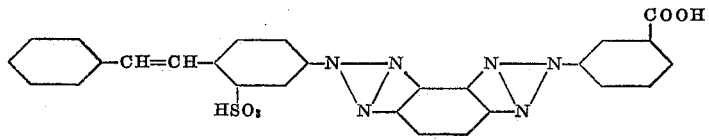

27.5 parts of 4-aminostilbene-2-sulphonic acid and 4.1 parts of sodium hydroxide are dissolved in 200 parts of water, 6.9 parts of sodium nitrite are added and the whole is diazotised at a temperature of 15–20° indirectly with 25 parts of concentrated hydrochloric acid and stirred until the nitrite reaction has been completed. The suspension of the diazo compound is then coupled at a temperature of 18–20° with an aqueous solution of the sodium salt of 25.4 parts of 5-amino-2-(3'-carboxyphenyl)-1.2.3-benztriazole. The mineral acid is buffered by the addition of 25 parts of crystallised sodium acetate and a further 5% by volume of technical pyridine is added to accelerate the coupling. On completion of the coupling, the dyestuff is salted out and filtered off. The damp o-aminoazo dyestuff, with the addition of 20 parts of 25% ammonia is dissolved in water at 90–95°, the mixture of 60 parts of crystallised copper sulphate in 240 copper sulphate in 240 parts of water and 120 parts of 25% ammonia, to form the ditriazole compound. After removal of the pyridine with steam, the raw product is purified as described above and a yellowish powder with the same properties is obtained.

EXAMPLE 2

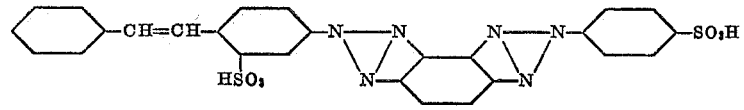

39.2 parts of 5-amino-2-(stilbyl-4')-1.2.3-benztriazole-2'-sulphonic acid are dissolved in 200 parts of hot dimethyl formamide, 200 parts of ice are added and 17.3 parts of diazotised sulphanilic acid are added at a temperature of from 12–15°. The mineral acid is then buffered with 25 parts of crystallised sodium acetate. On completion of the coupling, the dyestuff is completely salted out, filtered off and washed. The damp o-aminoazo dyestuff is dissolved in warm pyridine and oxidised at 90–95° to form the ditriazole compound with a mixture of 60 parts of crystallised copper sulphate in 240 parts of water and 120 parts of 25% ammonia. The copper is removed and the raw product is purified as described in Example 1 whereupon it is dried in the vacuum. The purified ditriazole compound is a yellowish powder, the dilute aqueous solutions of which are almost colourless. The product can be used for the brightening of cellulose fibres, soaps and synthetic washing agents. Like the compound described in Example 1, it is also very fast to chlorine and light. The identical ditriazole compound is also obtained if 27.5 parts of diazotised 4-aminostilbene-2-sulphonic acid are coupled with 29.0 parts of 5-amino-2-phenyl-1.2.3-benztriazole-4'-sulphonic acid to form the o-aminoazo dyestuff and this is oxidised either with sodium hypochlorite liquor or with copper tetramine salts to form the ditriazole compound. The product so obtained has the same properties as that described above.

The diazo compound of 27.5 parts of 4-aminostilbene-2-sulphonic acid is coupled at a temperature of 15-18° with a solution which is obtained by dissolving 39.2 parts of 5-amino-2-(stilbyl-4')-1.2.3-benztriazole-2'-sulphonic acid in 200 parts of hot dimethyl formamide and then adding 200 parts of ice. To neutralise the mineral acid, 25 parts of crystallised sodium acetate are added. On completion of the coupling, the dyestuff is salted out, filtered off and washed. The damp o-aminoazo dyestuff is dissolved at a temperature of 90-95° in pyridine, a mixture of 60 parts of crystallised copper sulphate in 240 parts of water and 120 parts of 25% ammonia is added and the whole is stirred in the water bath until the oxidation of the dyestuff is complete. After cooling, with the addition of sodium chloride, the

EXAMPLE 3

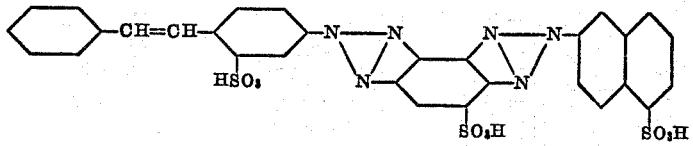

20.3 parts of 2-aminonaphthalene-5-sulphonic acid are indirectly diazotised and the diazo compound is coupled at a temperature of 10-15° with a solution of the disodium salt of 47.2 parts of 5-amino-2-(stilbyl-4')-1.2.3-benztriazole-2'.6-disulphonic acid in 1400 parts of water with the addition of 25 parts of crystallised sodium acetate. On completion of the coupling, the o-aminoazo dyestuff is completely salted out, filtered off and washed. It is then dissolved, with the addition of caustic soda lye at a phenolphthalein alkaline reaction, in hot water. At a temperature of 35-40°, 100 to 120 parts of a sodium hypochlorite solution which contains 17% of active chlorine, are added dropwise within 15 minutes. On completion of the dropwise addition, the temperature is raised within half an hour to 80-85° during which time nitrite paper should always show an excess of active chlorine. On completion of the oxidation, the reaction mixture is cooled, the raw product is salted out and filtered off. It is further purified by again dissolving in hot water, adding 3-8 parts of sodium hydrosulphite to decompose the oxidation products and the solution, with the addition of some animal charcoal, is filtered hot. The ditriazole compound is then salted out, filtered off, washed and dried in the vacuum. It is a yellow powder, the diluted aqueous solutions of which are almost colourless. Due to its substantivity, the compound draws on to cellulose fibres even from diluted solutions and lends them a white shading in daylight. It can also be used as a brightening agent for soap powders and synthetic washing agents. The brightening effects attained therewith are distinguished by their excellent fastness to chlorine and very good fastness to light.

aqueous layer containing copper salts is separated from the pyridine, the pyridine layer is washed several times with salt water containing ammonia and then, with the addition of 10 parts of sodium hydroxide and 2-5 parts of sodium hydrosulphite, the pyridine is distilled off with steam. The ditriazole compound is completely precipitated by the addition of sodium chloride to the aqueous solution, it is filtered off and washed. To further purify, the product can be dissolved in hot aqueous ethylene glycol monomethyl ether and, with the addition of some animal charcoal, filtered hot. The solution so obtained is poured into 4-5 times the volume of about a 10% sodium chloride solution, the precipitated product is filtered off, washed and dried in the vacuum. The new ditriazole compound is a yellowish powder which is difficultly soluble in water. The product is a valuable brightening agent for cellulose fibres, soap powders and synthetic washing agents. It has very good fastness to chlorine and excellent fastness to light. In particular on cellulose fibres, it has very good wet fastness and hydrogen peroxide fastness properties.

EXAMPLE 5

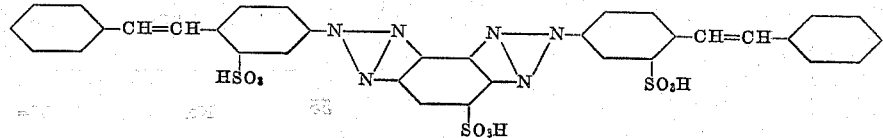

The suspension of 27.5 parts of diazotised-4-aminostilbene-2-sulphonic acid is added at a temperature of 10-15° to a neutral solution of 47.2 parts of 5-amino-2-(stilbyl-4')-1.2.3-benztriazole-2'.6-disulphonic acid in 1400 parts of water and the mineral acid is buffered by the addition of 25 parts of crystallised sodium acetate. On completion of the coupling, the dyestuff is completely salted out, filtered off and washed. The damp paste is dissolved with caustic soda lye in hot water with an alkaline reaction and, at a temperature of 35-

EXAMPLE 4

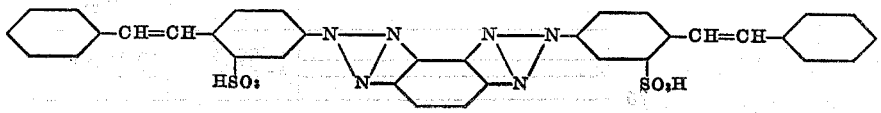

40°, is added to about 100–120 parts of a sodium hypochlorite solution which contains 17% active chlorine, the addition being performed within 15 minutes. The temperature is then raised within half an hour to 80–85°. Starch/iodide paper should always show an excess of active chlorine. On completion of the oxidation, the raw ditriazole compound is salted out and filtered off. The product is purified by dissolving it in hot water and the oxidation products are decomposed at a temperature of 90–95° by reduction with 3–8 parts of hydrosulphite. Animal charcoal is then added and the solution is filtered hot. The product is salted out from this aqueous solution, washed and dried in the vacuum. The ditriazole compound is a yellow powder the diluted aqueous solutions of which are pale yellowish coloured. The product is an interesting brightening agent for cellulose fibres, soap powders and synthetic washing agents. On these substrata it is very fast to chlorine and light.

EXAMPLE 6

White cotton poplin is treated with 0.01% (calculated on the weight of the fibres) of the ditriazole compound obtained according to Example 1 in the presence of 5% of Glauber's salt (calculated on the weight of the fibres) the treatment being given in a bath the liquor ratio of which is 1:50 for 15 minutes at 60°. After rinsing and drying, the treated material has a considerably more white appearance than before treatment.

EXAMPLE 7

1 part of white wash, e. g. pillow cases, sheets etc. are washed in 10 parts of a washing liquor containing 3 g. of curd soap, 2 g. of sodium carbonate and 0.003 g. of the ditriazole compound per litre obtained according to Example 1, the washing being done in the usual manner at 90–100°. The good are then rinsed and dried.

A dazzling white wash is obtained which has no unpleasant reddish tinge.

The following compounds can be produced according to the methods described in the Examples 1–5. They also have similar properties:

Table 1

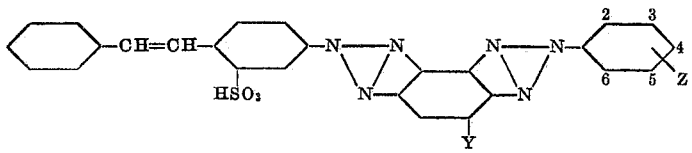

| No. | Y= | Z= | Fluorescence colour in U. V. light; 0.01 g./litre |
|---|---|---|---|
| 1 | —H | 2—Cl | blue-green. |
| 2 | —$SO_3H$ | 4—Cl | green. |
| 3 | —H | 3—O—$CH_3$ | blue-green. |
| 4 | —$SO_3H$ | 2—$CH_3$; 5—$OCH_3$ | green-blue. |
| 5 | —$SO_3H$ | 2,5(—O—$CH_3$)$_2$ | Do. |
| 6 | —$SO_3H$ | 4—O—$C_2H_5$ | Do. |
| 7 | —$SO_3H$ | 4—⌬ | green. |
| 8 | —H | 4—COOH | blue-green. |
| 9 | —H | 3—$SO_3H$ | green-blue. |
| 10 | —$CH_3$ | 3—$SO_3H$ | Do. |
| 11 | —O—$CH_3$ | 3—$SO_3H$ | green. |
| 12 | —O—⌬ | 3—$SO_3H$ | blue-green. |
| 13 | —H | 4—O—⌬; —$SO_3H$ | blue. |
| 14 | —$SO_3H$ | 4—O—⌬—$CH_3$; —$SO_3H$ | green. |
| 15 | —$SO_3H$ | 4—NH—CO—$CH_3$ | Do. |
| 16 | —O—⌬ | 4—$SO_3H$ | blue-green. |
| 17 | Cl | 3—$SO_3H$ | green-blue. |
| 18 | Cl | 3—COOH | Do. |
| 19 | —$SO_2NH_2$ | 3—$SO_3H$ | green. |
| 20 | —$SO_2NH_2$ | 4—$SO_3H$ | Do. |
| 21 | —$SO_2CH_3$ | 3—$SO_3H$ | blue-green. |
| 22 | —$SO_2CH_3$ | 4—$SO_3H$ | Do. |

Table 2

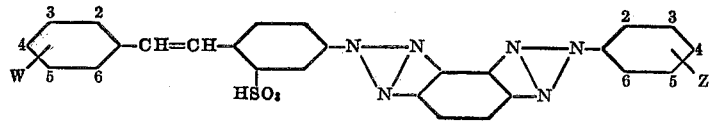

| No. | W= | Z= | Fluorescence colour in U. V. light; 0.01 g./litre |
|---|---|---|---|
| 23 | 4—$CH_3$ | 3—$SO_3H$ | green-blue. |
| 24 | 2—O—$CH_3$ | 3—$SO_3H$ | Do. |

Table 3

| No. | R= | Fluorescence colour in U. V. light; 0.01 g./litre |
|---|---|---|
| 25 | 4—$SO_3H$ | green-blue. |
| 26 | 5—$SO_3H$ | blue. |

Table 4

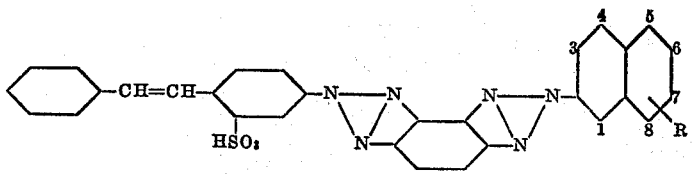

| No. | R= | Fluorescence colour in U. V. light 0.01 g./litre |
|---|---|---|
| 27 | 5—SO₃H | green-blue. |
| 28 | 6,8 (—SO₃H)₂ | blue-green. |

Table 5

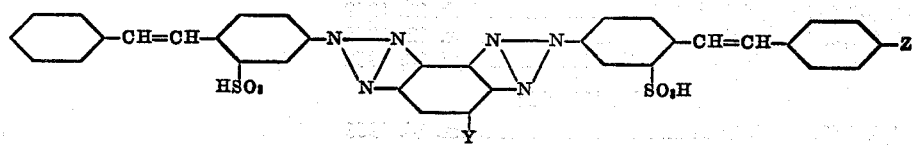

| No. | Y= | Z= | Fluorescence colour in U. V. light; 0.01 g./litre |
|---|---|---|---|
| 29 | —CH₃ | —H | green. |
| 30 | —O—CH₃ | —H | Do. |
| 31 | —H | —CH₃ | green-blue. |

What we claim is:

1. As an optical brightening agent a stilbyl ditriazole compound corresponding to the formula

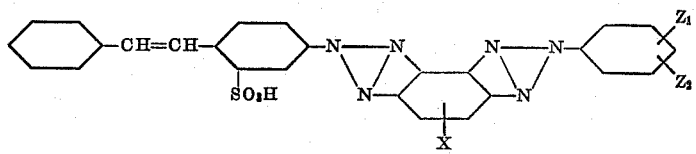

wherein X represents a member selected from the group consisting of H, CH$_3$, OCH$_3$, O—C$_6$H$_5$, Cl, SO$_3$H, SO$_2$NH$_2$ and SO$_2$CH$_3$, each of Z$_1$ and Z$_2$ represents a member selected from the group consisting of H, CH$_3$, Cl, OCH$_3$, OC$_2$H$_5$, O—C$_6$H$_5$, O—C$_6$H$_4$—CH$_3$, C$_6$H$_5$, NHCOCH$_3$, SO$_3$H and

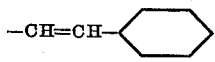

and Z$_1$ and Z$_2$ together represent a sulphonated benzo radical.

2. As an optical brightening agent a stilbyl ditriazole compound of the formula:

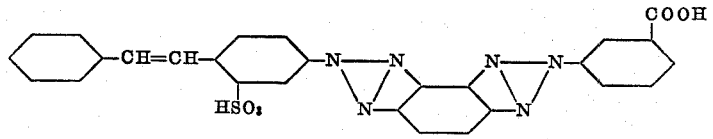

3. As an optical brightening agent a stilbyl ditriazole compound of the formula:

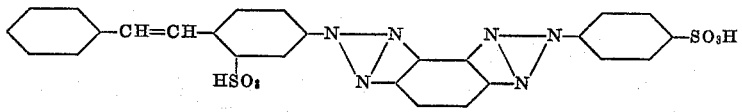

4. As an optical brightening agent a stilbyl ditriazole compound of the formula:

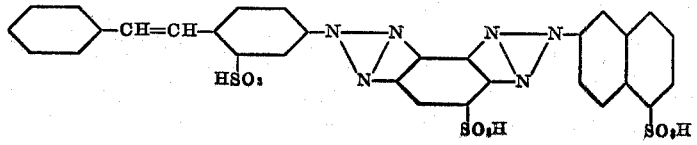

5. As an optical brightening agent a stilbyl ditriazole compound of the formula:
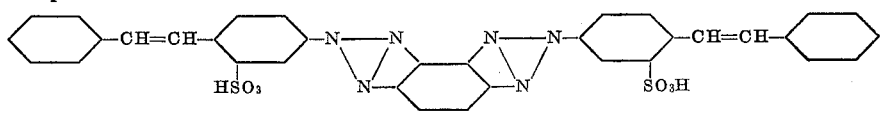
6. As an optical brightening agent a stilbyl ditriazole compound of the formula:
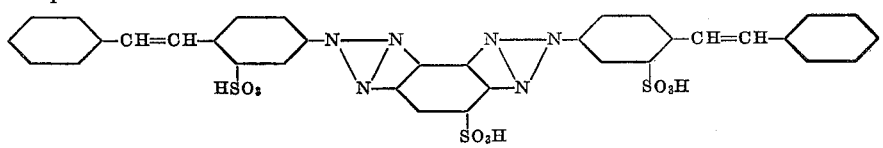
References Cited in the file of this patent
UNITED STATES PATENTS
| | | |
|---|---|---|
| 2,462,405 | Keller et al. | Feb. 22, 1949 |
| 2,467,262 | Knight | Apr. 12, 1949 |
| 2,713,057 | Zweidler et al. | Apr. 30, 1952 |
FOREIGN PATENTS
| | | |
|---|---|---|
| 1,054,820 | France | Oct. 14, 1953 |